US012624207B2

(12) United States Patent
Callahan

(10) Patent No.: US 12,624,207 B2
(45) Date of Patent: May 12, 2026

(54) BARRIER ADDITIVE COMPOSITIONS FOR CONTAINERS

(71) Applicant: BP Polymers, LLC, Irvine, CA (US)

(72) Inventor: Kevin J. Callahan, Charlottesville, VA (US)

(73) Assignee: BP Polymers, LLC, Irvine, CA (US)

( * ) Notice: Subject to any disclaimer, the term of this patent is extended or adjusted under 35 U.S.C. 154(b) by 0 days.

(21) Appl. No.: 18/771,388

(22) Filed: Jul. 12, 2024

(65) Prior Publication Data

US 2024/0360311 A1 Oct. 31, 2024

Related U.S. Application Data

(62) Division of application No. 17/961,936, filed on Oct. 7, 2022, now Pat. No. 12,146,056.

(60) Provisional application No. 63/262,322, filed on Oct. 8, 2021.

(51) Int. Cl.
*C08L 77/06* (2006.01)
*C08L 23/06* (2006.01)

(52) U.S. Cl.
CPC ............... *C08L 77/06* (2013.01); *C08L 23/06* (2013.01); *C08L 2207/062* (2013.01)

(58) Field of Classification Search
CPC ................ B29C 49/0005; B29C 49/04; B29K 2023/06; B29K 2023/12; B29K 2077/00; B29K 2995/0067; B29K 2995/0069; C08L 2207/062; C08L 23/06; C08L 51/06; C08L 77/02; C08L 77/06
See application file for complete search history.

(56) References Cited

U.S. PATENT DOCUMENTS

| | | | |
|---|---|---|---|
| 4,684,576 | A | 8/1987 | Tabor et al. |
| 5,024,897 | A | 6/1991 | Mason et al. |
| 6,319,976 | B1 | 11/2001 | DeNicola et al. |
| 7,368,496 | B2 | 5/2008 | Kim et al. |
| 2004/0013833 | A1 | 1/2004 | Lee et al. |
| 2005/0069719 | A1 | 3/2005 | Blemberg et al. |
| 2005/0215694 | A1 | 9/2005 | Kim et al. |
| 2007/0092674 | A1 | 4/2007 | Gutwillig |
| 2008/0021156 | A1 | 1/2008 | Arpin et al. |
| 2014/0302947 | A1 | 10/2014 | Sullivan et al. |
| 2015/0247014 | A1 | 9/2015 | Oner-Deliormanli et al. |
| 2018/0030253 | A1* | 2/2018 | Barion .................... B32B 27/32 |
| 2018/0273739 | A1 | 9/2018 | Moriya et al. |
| 2019/0224951 | A1 | 7/2019 | Zennyoji et al. |
| 2021/0316920 | A1 | 10/2021 | Ito |
| 2023/0110430 | A1 | 4/2023 | Callahan |

FOREIGN PATENT DOCUMENTS

| | | | |
|---|---|---|---|
| JP | 2023003297 A * | 1/2023 | |
| WO | 2009105059 A1 | 8/2009 | |

OTHER PUBLICATIONS

JP-2023003297-A (Jan. 11, 2023) machine translation.*
Dow Packaging & Specialty Plastics Product Data Sheet for Fusabond N216 dated Nov. 2019 (3 pages).
Dow Product Data Sheet for Fusabond N216 Functional Polymer dated Nov. 2019 (3 pages).
Dow Safety Data Sheet for Fusabond N216 Functional Polymer dated Apr. 14, 2020 (11 pages).
Dow. Fusabond E205 Functional Polymer Product Data Sheet dated Nov. 2019 (3 pages).
Dow. Fusabond E205 Functional Polymer Regulatory Data Sheet dated Apr. 15, 2020 (6 pages).
Dow. Fusabond E205 Functional Polymer Regulatory Data Sheet dated Jul. 8, 2020 (7 pages).
DuPont Bynel resins Product Data Sheet. Jan. 26, 2018 (3 pages).
DuPont Innovative Solutions for Extrusion Blow Molding Brochure. Sep. 2013 (7 pages).
Greene, Joe. Engineering Thermoplastics. Nylons (PA), Acetals (POM), Polyesters (PBT and PET), PC, Acrylics (PMMA), PTFE, PPO, PPS, PEEK. Slideshow dated Mar. 15, 2011. Available online at http://ssc.bibalex.org/viewer/detail.jsf;jsessionid=053C6F21EA7761DF0CF1C05B9465FE02?lid=CCD3E3E1555D76005D676FA7AC1B5F28&aid=A27B8A0840E100DF2B9061AFCB6DF1F3&category=8CC346B48786F0829E6387319F6B29D4&sort=1&page=1. (60 pages).
Nylene 494P IM Technical Datasheet. May 17, 2017 (1 page).
Nylene 607 (ISO) Technical Datasheet. Oct. 16, 2017 (1 page).
Nylene 607 Technical Datasheet. Jul. 22, 2013 (1 page).
Nylene 615SA Technical Datasheet. Jul. 23, 2013 (1 page).
Nylene 764B Technical Datasheet. May 17, 2017 (1 page).
OREVAC 18507 High-density polyethylene based coupling agent for filled compounds. Brochure. Apr. 2014. (2 pages).
SK Functional Polymer. OREVAC IM800/IM800N Technical Data Sheet. Jul. 2020. (2 pages).
International Search Report and Written Opinion for Application No. PCT/US2022/046046 dated Mar. 14, 2023 (16 pages).
Capron 8351 Nylon 6 properties, accessed from the web at https://www.plastore.it/cgi2018/file818/3231_pa%206%20capron%208351hs.pdf on Feb. 8, 2023, PDF of the properties of compounds listed in U.S. Pat. No. 6,319,976B1 (1 page).
Polybond 3200 Maleic anhydride grafted polypropylene properties, accessed from the web at https://www.chempoint.com/products/si-group/si-group-polymer-modifiers/polybond-polypropylene-based-coupling-agents/polybond-3200 on Feb. 8, 2023, PDF of the properties of compounds listed in U.S. Pat. No. 6,319,976B1 (2 pages).
U.S. Appl. No. 18/796,853, filed Aug. 7, 2024, by Callahan. (not submitted herewith pursuant to the waiver of 37 C.F.R. § 1.98(a)(2)(iii) issued by the Office on Oct. 19, 2004).

(Continued)

*Primary Examiner* — Ana L. Woodward
(74) *Attorney, Agent, or Firm* — Michael Best & Friedrich LLP

(57) ABSTRACT

Exemplary barrier additive compositions have useful barrier properties. An exemplary barrier additive composition includes a nylon 6, a compatibilizer including maleic anhydride grafted polyethylene or polypropylene, and an optional optical tracer. The barrier additive composition can be used in containers for liquid chemicals, such as petroleum derived products. Also disclosed are polymer blends and films that include the barrier additive composition, methods of making the barrier additive composition, and methods of making containers and films that include the barrier additive composition.

10 Claims, 6 Drawing Sheets

(56) References Cited

OTHER PUBLICATIONS

European Patent Office. Extended European Search Report for Application No. 22879327.9, dated Jul. 3, 2025 (23 pages).
BP Polymers—English: "BP Polymers 1-15 INV. Introduces Kortrax Barrier Resin for HDPE B32B27/18 Containers", Jan. 17, 2019 (Jan. 17, 2019), Retrieved from the Internet: URL:https://www.prweb.com/releases/BP_Polymers_Introduces_Kortrax_Barrier_Resin_for_HDPE_Containers/prweb16037723.htm (3 pages).
Anonymous: "4L, 5L, 6L and 10L Jerry Can 1-15 ¦ Barrier Plastics, Inc.", Feb. 5, 2019 (Feb. 5, 2019), Retrieved from the Internet: URL:https://web.archive.org/web/20190205121537/http://baritainer.com:80/baritainers-4l-5l-6l-10l-jerry-can-din50-neck-finish (5 pages).

* cited by examiner

The enclosed data are based on a concentration of 9% KORTRAX BR and testing at 25°C/77°F. We always recommend customer testing.

++ = excellent = no wt loss or visible deformity
+ = good = wt loss below 2% and no deformity

| | | | |
|---|---|---|---|
| Acetic Acid | + | Ink | ++ |
| Acetone | ++ | Isopropanol | ++ |
| Benzene | ++ | Ketones | ++ |
| Brake Fluid | + | Linseed Oil | ++ |
| Butane | ++ | Lubrication Oil | ++ |
| Chlorobenzene | ++ | Methane | ++ |
| Chlorodefluoroethylene | ++ | Methanol | + |
| Chlorodefluoromethane | ++ | Methyl Ethyl Ketone | ++ |
| Citrus Oils | ++ | Methyl Glycol | + |
| Cyclohexane | ++ | Monochloroethyl Acetate | ++ |
| Cyclohexanol | ++ | Monochoromethyl Acetate | ++ |
| Cyclohexanone | ++ | Naphthalene | ++ |
| Dichlorobenzene | + | Nitrobenzene | ++ |
| Dichloroethane | + | Paint Solvents | ++ |
| Dichlorofluoromethane | ++ | Palm Oils | + |
| Dichlorotetrafluoroethane | ++ | Paraffin Oil | + |
| Dioxan | ++ | Paraxylene | + |
| Edible Fats and Oils | ++ | Phenol | ++ |
| Ethanol | ++ | Polyglycols | ++ |
| Fats and Waxes, edible | ++ | Propanol | + |
| Fatty Acids | ++ | Pyridine | ++ |
| Fatty Alcohols | ++ | Shellsol A/AB | ++ |
| Fruit Juices | ++ | Silicone Oils | ++ |
| Fuel, Diesel | ++ | Solvesso 100/150 | ++ |
| Fuel, Gasoline | ++ | Sulfolane | + |
| Gear Oil | ++ | Terpenes | ++ |
| Glycerol | ++ | Tetralin | ++ |
| Grease | ++ | Thinner | + |
| Heptane | ++ | Toulene | ++ |
| Hexachloroethane | ++ | Trichloreothylene | ++ |
| Hexachlorobenzene | ++ | Trichlorotrifluoroethane | ++ |
| Hexane | ++ | Triethanolamine | ++ |
| Hydraulic Fluid | ++ | Turpentine | + |
| Hydraulic Oil | + | Xylene | ++ |

FIG. 5

BARRIER ADDITIVE COMPOSITIONS FOR CONTAINERS

CROSS-REFERENCE TO RELATED APPLICATIONS

This application is a divisional of U.S. patent application Ser. No. 17/961,936, filed on Oct. 7, 2022, which application claims priority to U.S. Provisional Patent Application No. 63/262,322 filed on Oct. 8, 2021, the entire contents of each of which are hereby incorporated by reference.

TECHNICAL FIELD

The present disclosure relates to materials, methods, and techniques for barrier additive compositions. Exemplary barrier additive compositions may be particularly suited for use in containers and films.

INTRODUCTION

General use polyolefins, such as polyethylene, find widespread application for their ease of manufacture and useful mechanical properties. But these polyolefins typically have less than suitable chemical and oxygen barrier properties, which can limit their application in areas such as the packaging and transporting of chemicals and chemical-based products. Accordingly, compositions and methods that improve these latter properties of polyolefins would be useful.

SUMMARY

In one aspect, disclosed are barrier additive compositions including a nylon 6, a compatibilizer, the compatibilizer including maleic anhydride grafted polyethylene or polypropylene, wherein the maleic anhydride is grafted at greater than 0.5% to less than 1.5% by weight of the polyethylene or polypropylene and, optionally, an optical tracer.

In another aspect, disclosed are polymer blends including a disclosed barrier additive composition and a polyolefin.

In another aspect, disclosed are containers including a body and a neck finish, wherein at least the body includes a disclosed barrier additive composition and a polyolefin.

In another aspect, disclosed are films including a disclosed barrier additive composition and a polyolefin, wherein the film has a thickness of about 0.05 mm to about 5 mm.

In another aspect, disclosed are methods of making a barrier additive composition, the method including blending a nylon 6 and a compatibilizer, the compatibilizer including maleic anhydride grafted polyethylene or polypropylene, wherein the maleic anhydride is grafted at greater than 0.5% to less than 1.5% by weight of the polyethylene or polypropylene, in a melt phase to form a barrier additive blend, and extruding the barrier additive blend into pellets.

In another aspect, disclosed are methods of making a container, the method including blending a disclosed barrier additive composition and a polyolefin in a melt phase to form a polymer blend, extruding the polymer blend to provide a parison in a mold, and blow molding the parison to provide the container.

In another aspect, disclosed are methods of making a film, the method including blending a disclosed barrier additive composition and a polyolefin in a melt phase to form a polymer blend, extruding the polymer blend, and blow molding the polymer blend to provide the film.

BRIEF DESCRIPTION OF THE DRAWINGS

FIG. 4A shows the FTIR region from 4000 $cm^{-1}$ to 2500 $cm^{-1}$. FIG. 4B. shows the FTIR region from 4000 $cm^{-1}$ to 450 $cm^{-1}$.

FIG. 5 shows compatibility of an example container with different solvents and oils.

DETAILED DESCRIPTION

Figure 1:
FIG. 1 is an image showing a horizontal surface (90° from parison) of an example container.

Disclosed herein are compositions that have advantageous barrier properties. These advantageous properties may make exemplary compositions particularly suited for liquid chemical containers. In particular, exemplary compositions can decrease leaching and/or permeation of the liquid chemical through the container. In certain implementations, exemplary compositions may be used with containers designed for petroleum derived products and/or naturally derived compounds such as those used in flavors and fragrances. Accordingly, the compositions are also referred to herein as barrier additive compositions.

I. Definitions

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. For example, when a pressure range is described as being between ambient pressure and another pressure, a pressure that is ambient pressure is expressly contemplated.

II. Example Barrier Additive Compositions

Exemplary barrier additive compositions are useful for containers that package liquid chemicals, where it may be desired to minimize the liquid chemical permeating and/or leaching out from the container. In addition, exemplary barrier additive compositions can offer cost-effective and environmentally friendly alternatives compared to presently used technologies.

Generally, exemplary barrier additive compositions include a nylon 6, a compatibilizer that includes maleic anhydride grafted polyethylene or polypropylene, and an optional optical tracer. In some instances, exemplary barrier additive compositions consist essentially of a nylon 6, a compatibilizer that includes maleic anhydride grafted polyethylene or polypropylene, and an optical tracer. In some instances, exemplary barrier additive compositions consist of a nylon 6, a compatibilizer that includes maleic anhydride grafted polyethylene or polypropylene, and an optical tracer. Various aspects of exemplary barrier additive compositions are discussed below.

The barrier additive composition can have a varying melting temperature. For example, the barrier additive composition can have a melting temperature of about 190° C. to about 235° C., such as about 195° C. to about 230° C., about 200° C. to about 225° C., about 200° C. to about 230° C., or about 190° C. to about 225° C. In some embodiments, the barrier additive composition has a melting temperature of greater than 190° C., greater than 200° C., greater than 210° C., or greater than 220° C. In some embodiments, the barrier additive composition has a melting temperature of less than 235° C., less than 230° C., or less than 225° C.

A. Nylon 6

Nylon 6 is a polyamide having recurring units of

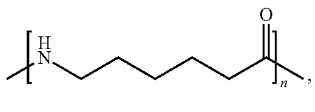

wherein n is 2 to 100.

In some embodiments, n is 2 to 75. In some embodiments, n is 2 to 50. In some embodiments, n is 2 to 30.

Exemplary nylon 6 can have a varying molecular weight. For example, nylon 6 can have a number average molecular weight of greater than or equal to 2,000 Daltons (Da), such as greater than or equal to 3,000 Da, greater than or equal to 4,000 Da, greater than or equal to 5,000 Da, greater than or equal to 6,000 Da, greater than or equal to 7,000 Da, greater than or equal to 8,000 Da, greater than or equal to 9,000 Da, greater than or equal to 10,000 Da, greater than or equal to 12,000 Da, greater than or equal to 15,000 Da, or greater than or equal to 18,000 Da. In some embodiments, nylon 6 has a number average molecular weight of less than or equal to 25,000 Da, less than or equal to 24,000 Da, less than or equal to 23,000 Da, or less than or equal to 22,000 Da. In some embodiments, nylon 6 has a number average molecular weight of about 2,000 Da to about 25,000 Da, such as about 2,000 Da to about 22,000 Da, about 5,000 Da to about 20,000 Da, about 10,000 Da to about 22,000 Da, or about 2,000 Da to about 12,000 Da.

Nylon 6 with various specific gravities may be used. For example, nylon 6 can have a specific gravity of about 1.0 $g/cm^3$ to about 1.3 $g/cm^3$, such as about 1.06 $g/cm^3$ to about 1.14 $g/cm^3$, about 1.07 $g/cm^3$ to about 1.13 $g/cm^3$, about 1.08 $g/cm^3$ to about 1.12 $g/cm^3$, about 1.09 $g/cm^3$ to about 1.14 $g/cm^3$, or about 1.06 $g/cm^3$ to about 1.10 $g/cm^3$.

Nylon 6 can have various melting points. For example, the nylon 6 can have a melting point of about 220° C. to about 235° C., such as about 225° C. to about 235° C., about 230° C. to about 235° C., about 220° C. to about 230° C., or about 220° C. to about 225° C.

The nylon 6 can have a varying flexural modulus. For example, the nylon 6 can have a flexural modulus of about 250,000 psi to about 450,000 psi, such as about 275,000 psi to about 425,000 psi, about 300,000 psi to about 400,000 psi, about 300,000 psi to about 450,000 psi, about 350,000 psi to about 450,000 psi, about 250,000 psi to about 400,000 psi, or about 250,000 psi to about 350,000 psi.

In some embodiments, the nylon 6 can have a specific gravity of about 1.06 $g/cm^3$ to about 1.14 $g/cm^3$, a melting point of about 220° C. to about 235° C., a flexural modulus of about 250,000 psi to about 450,000 psi, or a combination thereof. In some embodiments, the nylon 6 has a specific gravity of about 1.06 $g/cm^3$ to about 1.14 $g/cm^3$, a melting point of about 220° C. to about 235° C., and a flexural modulus of about 250,000 psi to about 450,000 psi.

The nylon 6 can be included in the barrier additive composition at varying amounts. For example, the barrier additive composition can include nylon 6 at about 40% to about 80% by weight of the composition, such as about 45% to about 75% by weight of the composition, about 50% to about 70% by weight of the composition, about 55% to about 65% by weight of the composition, about 45% to about 55% by weight of the composition, about 45% to about 65% by weight of the composition, about 50% to about 80% by weight of the composition, about 60% to about 80% by weight of the composition, or about 70% to about 80% by weight of the composition. In various implementations, the barrier additive composition can include nylon 6 at no less than 40 wt %; no less than 45 wt %; no less than 50 wt %; no less than 55 wt %; no less than 60 wt %; no less than 65 wt %; no less than 70 wt %; or no less than 75 wt %. In various implementations, the barrier additive composition can include nylon 6 at no greater than 80 wt %; no greater than 75 wt %; no greater than 70 wt %; no greater than 65 wt %; no greater than 60 wt %; no greater than 55 wt %; no greater than 50 wt %; or no greater than 45 wt %.

B. Compatibilizer

The compatibilizer can aid the stability and properties of a polymer blend that includes two different polymers having reduced miscibility. For example, the compatibilizer can promote stability and improve the properties of a polymer blend that includes a barrier additive composition as disclosed herein, and a polyolefin, such as in the disclosed containers. In some embodiments, the compatibilizer reduces delamination of the barrier additive compositions.

The compatibilizer includes a maleic anhydride grafted polyethylene or polypropylene. The polyethylene and polypropylene can also be referred to as a carrier polymer. In some embodiments, the polyethylene of the compatibilizer is selected from the group consisting of a linear low-density polyethylene, a low-density polyethylene, a high-density polyethylene, and a combination thereof. In some embodiments, the polyethylene of the compatibilizer is selected from the group consisting of a linear low-density polyethylene, a low-density polyethylene, and a high-density polyethylene. In some embodiments, the polyethylene of the compatibilizer is a low-density polyethylene. The polyethylene or polypropylene of the compatibilizer can have a density of about 0.92 g/cm$^3$ to about 0.97 g/cm$^3$, such as about 0.93 g/cm$^3$ to about 0.96 g/cm$^3$, about 0.94 g/cm$^3$ to about 0.97 g/cm$^3$, or about 0.92 g/cm$^3$ to about 0.95 g/cm$^3$.

The maleic anhydride can be grafted to the polyethylene or polypropylene at a percentage, by weight of the polyethylene (if the polymer is polyethylene) or the polypropylene (if the polymer is polypropylene), of greater than 0.5% to less than 1.5%, such as about 0.7% to about 1.4%, about 0.8% to about 1.3%, about 0.9% to about 1.4%, about 1% to about 1.5%, or about 1% to about 1.3%. In some embodiments, the maleic anhydride is grafted at about 1 wt % to about 1.3 wt % by weight of the polyethylene or polypropylene. In some embodiments, the maleic anhydride is grafted at greater than 0.5 wt %, greater than 0.6 wt %, greater than 0.7 wt %, greater than 0.8 wt %, greater than 0.9 wt %, or greater than 1.0 wt % by weight of the polyethylene or polypropylene. In some embodiments, the maleic anhydride is grafted at less than 1.5 wt %, less than 1.45 wt %, or less than 1.4 wt % by weight of the polyethylene or polypropylene.

The compatibilizer can have a varying specific gravity. For example, the compatibilizer can have a specific gravity of about 0.875 g/cm$^3$ to about 0.960 g/cm$^3$, such as about 0.880 g/cm$^3$ to about 0.950 g/cm$^3$, about 0.890 g/cm$^3$ to about 0.940 g/cm$^3$, about 0.875 g/cm$^3$ to about 0.940 g/cm$^3$, or about 0.890 g/cm$^3$ to about 0.960 g/cm$^3$. In some embodiments, the compatibilizer has a specific gravity of greater than 0.875 g/cm$^3$, greater than 0.890 g/cm$^3$, greater than 0.900 g/cm$^3$, greater than 0.910 g/cm$^3$, greater than 0.930 g/cm$^3$, or greater than 0.950 g/cm$^3$. In some embodiments, the compatibilizer has a specific gravity of less than 0.960 g/cm$^3$, less than 0.940 g/cm$^3$, less than 0.920 g/cm$^3$, less than 0.900 g/cm$^3$, less than 0.890 g/cm$^3$, or less than 0.880 g/cm$^3$.

The compatibilizer can have a varying melting point. For example, the compatibilizer can have a melting point of about 63° C. to about 130° C., such as about 70° C. to about 120° C., about 80° C. to about 110° C., about 63° C. to about 110° C., about 63° C. to about 100° C., about 90° C. to about 120° C., or about 90° C. to about 130° C. In some embodiments, the compatibilizer has a melting point of greater than 63° C., greater than 65° C., greater than 70° C., greater than 75° C., greater than 80° C., greater than 85° C., greater than 90° C., greater than 95° C., or greater than 100° C. In some embodiments, the compatibilizer has a melting point of less than 130° C., less than 125° C., less than 120° C., less than 115° C., less than 110° C., less than 105° C., less than 100° C., less than 95° C., or less than 90° C.

In some embodiments, the compatibilizer has a specific gravity of about 0.875 g/cm$^3$ to about 0.960 g/cm$^3$, a melting point of about 63° C. to about 130° C., or a combination thereof. In some embodiments, the compatibilizer has a specific gravity of about 0.875 g/cm$^3$ to about 0.960 g/cm$^3$, and a melting point of about 63° C. to about 130° C.

The compatibilizer can be included in the barrier additive composition at varying amounts. For example, the barrier additive composition can include the compatibilizer at about 25% to about 60% by weight of the composition, such as about 30% to about 55% by weight of the composition, about 35% to about 50% by weight of the composition, about 40% to about 50% by weight of the composition, about 25% to about 40% by weight of the composition, about 25% to about 50% by weight of the composition, about 30% to about 60% by weight of the composition, about 40% to about 60% by weight of the composition, or about 45% to about 60% by weight of the composition. In some embodiments, the barrier additive composition includes the compatibilizer at greater than 25% by weight of the composition, greater than 30% by weight of the composition, greater than 35% by weight of the composition, or greater than 40% by weight of the composition. In some embodiments, the barrier additive composition includes the compatibilizer at less than 60% by weight of the composition, less than 55% by weight of the composition, less than 50% by weight of the composition, or less than 45% by weight of the composition.

C. Optical Tracer

The barrier additive composition can include an optional optical tracer. In some embodiments, the barrier additive composition includes an optical tracer. The optical tracer can be added to the barrier additive composition and can be used to identify the presence of the barrier additive composition in, e.g., a container. Accordingly, the optical tracer can be used to confirm both the presence of and the distribution of the barrier additive composition within a container. The optical tracer can be any compound that can be detected directly or after applying a stimulus. For example, the optical tracer can be a UV tracer or a fluorescent tracer that emits light when exposed to a certain wavelength of light. In some embodiments, the optical tracer is a UV tracer where its presence is detected by using a UV flashlight.

Examples of optical tracers include, but are not limited to, ultraviolet tracers, fluorescent tracers, and combinations thereof. In some embodiments, the optical tracer includes an ultraviolet tracer, a fluorescent tracer, or a combination thereof. In some embodiments, the optical tracer includes an ultraviolet tracer or a fluorescent tracer. In some embodiments, the optical tracer includes an ultraviolet tracer.

The optical tracer can be included in the barrier additive composition at varying amounts. For example, the barrier additive composition can include the optical tracer at about 0.5% to about 5% by weight of the composition, such as about 0.75% to about 4.5% by weight of the composition, about 1% to about 4% by weight of the composition, about 1.5% to about 3% by weight of the composition, about 0.5% to about 4% by weight of the composition, about 0.5% to about 3% by weight of the composition, about 1% to about 5% by weight of the composition, about 1.5% to about 5% by weight of the composition, or about 2% to about 5% by weight of the composition. In some embodiments, the barrier additive composition includes the optical tracer at greater than 0.5% by weight of the composition, greater than 1% by weight of the composition, greater than 1.5% by weight of the composition, greater than 2% by weight of the composition, greater than 2.5% by weight of the composition, or greater than 3% by weight of the composition. In some embodiments, the barrier additive composition includes the optical tracer at less than 5% by weight of the composition, less than 4.5% by weight of the composition, less than 4% by weight of the composition, less than 3.5% by weight of the composition, less than 3% by weight of the composition, or less than 2.5% by weight of the composition.

III. Example Polymer Blends

Further disclosed are polymer blends that include the barrier additive composition. The polymer blend can include the barrier additive composition and a polyolefin. The polymer blend can further include varying additives that can aid in the processing of the polymer blend, e.g, by extrusion and/or blow molding. Exemplary additives include, but are not limited to, UV protection additives, heat protection additives, and antioxidant protection additives. In some embodiments, the polymer blend includes a UV protection additive, a heat protection additive, an antioxidant protection additive, or a combination thereof. In some embodiments, the polymer blend includes a UV protection additive, optionally a heat protection additive, and optionally an antioxidant protection additive.

Varying polyolefins can be used in the polymer blend. Examples include, but are not limited to, polyethylene, polypropylene and copolymers thereof (e.g., ethylene-propylene copolymer). Examples of polyethylene include, but are not limited to, high-density polyethylene, low-density polyethylene, and linear low-density polyethylene. In some embodiments, the polyolefin includes a high-density polyethylene, a low-density polyethylene, a linear low-density polyethylene, an ethylene-propylene copolymer, a polypropylene, or a combination thereof. In some embodiments, the polyolefin includes a high-density polyethylene, a low-density polyethylene, a linear low-density polyethylene, or a combination thereof.

The polyolefin can have a varying density. For example, the polyolefin can have an average density of about 0.91 $g/cm^3$ to about 0.96 $g/cm^3$, such as about 0.92 $g/cm^3$ to about 0.95 $g/cm^3$, about 0.93 $g/cm^3$ to about 0.96 $g/cm^3$, or about 0.91 $g/cm^3$ to about 0.94 $g/cm^3$. In some embodiments, the polyolefin has an average density of greater than 0.91 $g/cm^3$, greater than 0.915 $g/cm^3$, greater than 0.92 $g/cm^3$, greater than 0.925 $g/cm^3$, or greater than 0.93 $g/cm^3$. In some embodiments, the polyolefin has an average density of less than 0.96 $g/cm^3$, less than 0.955 $g/cm^3$, less than 0.95 $g/cm^3$, less than 0.945 $g/cm^3$, or less than 0.94 $g/cm^3$.

The barrier additive composition can be included in the polymer blend at varying amounts. For example, the polymer blend can include the barrier additive composition at about 5% to about 25% by weight of the polymer blend, such as about 6% to about 22%, about 10% to about 20%, about 5% to about 15%, or about 15% to about 25% by weight of the polymer blend. In some embodiments, the polymer blend includes the barrier additive composition at greater than 5% by weight of the polymer blend, greater than 10% by weight of the polymer blend, greater than 15% by weight of the polymer blend, or greater than 20% by weight of the polymer blend. In some embodiments, the polymer blend includes the barrier additive composition at less than 25% by weight of the polymer blend, less than 20% by weight of the polymer blend, less than 15% by weight of the polymer blend, or less than 10% by weight of the polymer blend.

The polyolefin can be included in the polymer blend at varying amounts. For example, the polymer blend can include the polyolefin at about 75% to about 98% by weight of the polymer blend, such as about 75% to about 97%, about 80% to about 95%, about 85% to about 95%, or about 80% to about 90% by weight of the polymer blend. In some embodiments, the polymer blend includes the polyolefin at greater than 75% by weight of the polymer blend, greater than 80% by weight of the polymer blend, greater than 82% by weight of the polymer blend, greater than 84% by weight of the polymer blend, greater than 86% by weight of the polymer blend, greater than 88% by weight of the polymer blend, or greater than 90% by weight of the polymer blend. In some embodiments, the polymer blend includes the polyolefin at less than 98% by weight of the polymer blend, less than 95% by weight of the polymer blend, less than 90% by weight of the polymer blend, less than 88% by weight of the polymer blend, less than 86% by weight of the polymer blend, less than 84% by weight of the polymer blend, or less than 82% by weight of the polymer blend.

The polymer blend can further include regrind (e.g., recycled polymer), a colorant, or both. The polymer blend may include the regrind at about 0% to about 50% by weight of the polymer blend. In addition, the polymer blend may include the colorant at about 0% to about 7% by weight of the polymer blend. It has also been found useful that, if a colorant is present, that it be free of stearates. In some embodiments, the colorant is essentially free of stearates. In some embodiments, the colorant is free of stearates. In some embodiments, the polymer blend does not include stearates.

IV. Example Containers

Also disclosed herein are containers that include the barrier additive composition. In addition to the barrier additive composition, the container can include a polyolefin. The description of the barrier additive compositions and the polyolefins above can be applied to the container as well. The container can include a body and a neck finish. The body, the neck, or both can include the polyolefin. In addition, the body, the neck, or both can include the barrier additive composition. In some embodiments, at least the body includes the barrier additive composition. In some embodiments, at least the body includes the polyolefin. In some embodiments, at least the body includes the barrier additive composition and the polyolefin.

The container can be used to transport, package, and/or store solvents and solvent-based products. Solvents include, but are not limited to, hydrocarbons, halogenated solvents, and oxygenated solvents. Solvent-based products include, but are not limited to, household chemicals, industrial chemicals, cleaning solvents, adhesives, wood preservatives, automotive additives, petroleum derived products, and agricultural products. In some embodiments, the container is used to transport, package, and/or store petroleum derived products. As discussed elsewhere, the barrier additive composition can aid in minimizing permeation and/or leaching of solvent-based products through the base material of the container, such as the polyolefin.

The use of the barrier additive composition can allow the container to avoid the use of other less environmentally friendly alternatives, such as fluorinated compounds (e.g., perfluorooctanesulfonic and perfluorooctanoic acids), steel, tin, clay, glass, and polyvinyl chloride resins. In some embodiments, the container does not include the aforementioned materials. In some embodiments, the container does not include fluorinated compounds. In some embodiments, the container does not include ethylene vinyl alcohol. In some embodiments, the container does not include polyacrylonitrile. In some embodiments, the container does not include fluorinated compounds, ethylene vinyl alcohol, or polyacrylonitrile.

The volume and the shape of the container is not limited and can be adapted, depending on the intended use of the container, by altering the extrusion/blow molding methods as disclosed below. In addition, in some embodiments, the container has ribs. In other embodiments, the container does not have ribs.

The barrier additive composition can have an advantageous morphology within the container. The container can have a polyolefin matrix and a barrier additive composition phase within the polyolefin matrix. For example, the barrier additive composition can have a lamellar structure in the polyolefin matrix. In some embodiments, the barrier additive composition forms multiple overlapping, discontinuous, and/or elongated platelets within the polyolefin matrix. In some embodiments, the barrier additive composition is a monolayer in the polyolefin matrix.

In some embodiments, the container includes a polyolefin where the polyolefin includes a high-density polyethylene, a low-density polyethylene, a linear low-density polyethylene, a polypropylene, or a combination thereof. In some embodiments, the container includes a high-density polyethylene or a polypropylene. In some embodiments, the container includes a high-density polyethylene.

Figure 3:
FIG. 3 is an image of example containers.

The barrier additive composition can minimize permeation and/or leaching of various molecules and compounds through the base material of the container. In particular, the barrier additive composition can instill improved solvent, vapor, and/or gas barrier properties to the container. For example, the container or any part of the container (e.g., neck, body, or both) may have a solvent barrier rate of no more than 2% as measured by solvent weight lost over a period of about 28 days at about 50° C., such as no more than 2.5%, no more than 3%, no more than 5%, or no more than 10% as measured by solvent weight lost over a period of about 28 days at about 50° C. In some embodiments, at least the body has a solvent barrier rate of no more than 2% as measured by solvent weight lost over a period of about 28 days at about 50° C. The solvent can be a solvent placed and/or stored in the container. Example solvents include those listed above and in FIG. 3.

The container or any part of the container (e.g., neck, body, or both) may have an oxygen transfer rate of at least 97% less compared to a container without the barrier additive composition, such as an oxygen transfer rate of at least 98% less compared to a container without the barrier additive composition, an oxygen transfer rate of at least 99% less compared to a container without the barrier additive composition, or an oxygen transfer rate of at least 99.9% less compared to a container without the barrier additive composition. In some embodiments, at least the body has an oxygen transfer rate of at least 97% less compared to a body without the barrier additive composition.

The container or any part of the container (e.g., neck, body, or both) may have a water vapor transmission rate of at least 99.98% less compared to a container without the barrier additive composition, such as a water vapor transmission rate of at least 99.985% less compared to a container without the barrier additive composition, a water vapor transmission rate of at least 99.99% less compared to a container without the barrier additive composition, or a water vapor transmission rate of at least 99.999% less compared to a container without the barrier additive composition. In some embodiments, at least the body has a water vapor transmission rate of at least 99.98% less compared to a body without the barrier additive composition.

In some embodiments, at least the body has an oxygen transfer rate of at least 97% less compared to a body without the barrier additive composition, a water vapor transmission rate of at least 99.98% less compared to a body without the barrier additive composition, or a combination thereof. The oxygen transfer rate and water vapor transmission rate of the container can be analyzed through techniques known within the art, such as by a MOCON permeation analyzer.

Due to the improved barrier properties, the presence of the barrier additive composition may improve the shelf-life of the product inside the container, as well as may improve overall safety of transporting and/or storing the products inside the container.

V. Example Films

Further disclosed herein are films that include the barrier additive composition. In addition to the barrier additive composition, the films can include a polyolefin. The description of the barrier additive compositions and the polyolefins above can be applied to the film as well. The disclosed films can have a thickness of about 0.05 mm to about 5 mm, such as about 0.07 to about 4.5 mm, about 0.1 mm to about 4 mm, about 0.12 mm to about 3 mm, about 0.05 mm to about 2 mm, about 0.05 mm to about 3 mm, about 1 mm to about 3 mm, about 1.5 mm to about 2.5 mm, about 1.9 mm to about 2.1 mm, about 0.5 mm to about 5 mm, or about 1 mm to about 5 mm. In some embodiments, the film has a thickness of greater than 0.05 mm, greater than 0.06 mm, greater than 0.07 mm, greater than 0.08 mm, greater than 0.09 mm, greater than 0.1 mm, greater than 0.2 mm, greater than 0.5 mm, greater than 1 mm, or greater than 1.5 mm. In some embodiments, the film has a thickness of less than 5 mm, less than 4.75 mm, less than 4.5 mm, less than 4.25 mm, less than 4 mm, less than 3.75 mm, less than 3.5 mm, less than 3.25 mm, less than 3 mm, or less than 2.5 mm.

The disclosed films can be used in similar applications as the containers, e.g., in the transportation, packaging, and/or storage of solvents and solvent-based products. In some embodiments, the film is coated or applied to a surface of a material. In some embodiments, the film is used to seal a receptacle or vessel housing or storing a solvent and/or solvent based product.

VI. Exemplary Methods

The barrier additive compositions, the nylon 6, the compatibilizers, the optical tracers, the polyolefins, the polymer blends, the containers, and the films described above can also be used with the exemplary methods disclosed herein.

A. Methods of Making Barrier Additive Compositions

An exemplary method of making a barrier additive composition can include blending a nylon 6 and a compatibilizer comprising maleic anhydride grafted polyethylene or polypropylene in a melt phase to form a barrier additive blend. Exemplary methods can further include extruding the barrier additive blend into pellets.

In some instances, exemplary methods may include spraying the nylon 6 with an optical tracer before blending with the compatibilizer. In some instances, exemplary methods may include spraying the extruded pellets with an optical tracer. In some instances, exemplary methods may include spraying the nylon 6 with an optical tracer before blending with the compatibilizer and spraying the extruded pellets with an optical tracer.

B. Methods of Making Containers

The barrier additive composition, the polyolefin, or both can be processed in varying ways to generate exemplary containers. For example, the barrier additive composition, the polyolefin, or both can be extruded, blow molded, or extruded and blow molded. In some embodiments, exemplary methods include processing the barrier additive composition, the polyolefin, or both, in a continuous extrusion/blow molding machine.

Exemplary methods of making a container can include blending a barrier additive composition and a polyolefin in a melt phase to form a polymer blend. The barrier additive composition and the polyolefin can be pellets and blended into a melt phase. The method can further include extruding and/or blow molding the polymer blend to provide a container.

Extruding can include providing a parison (e.g., a preform), which is a hollow tube structure including the barrier additive composition, the polyolefin, or both, in a mold. For example, the parison can be extruded into the mold through a first open end. The mold can have a second open end, opposite the first open end, which can be closed-pinching off the parison. A gas, such as compressed air, can be blown into and/or through the parison, which can inflate the parison to conform to the shape of the mold, thereby providing a container. The container can be removed from the mold, trimmed, and processed via means known within the art. The extruding and/or blow molding can be performed at varying temperature ranges as discussed below. In some embodiments, the extruding and/or blow molding can be performed at a temperature at about the melting point of the additive barrier composition.

Before adding the barrier additive composition, the polyolefin may be run through the machine until steady state conditions are reached. For example, the parison melt temperature can be about 220° C. to about 225° C. The parison melt temperature can be monitored by, e.g., a temperature probe pyrometer. Different zone(s) of the machine can be altered to achieve and/or maintain the aforementioned parison melt temperature. In some embodiments, the barrel temperature does not exceed 250° C. Following steady state and the aforementioned temperature targets, the barrier additive composition can be fed until steady state conditions are reached.

The extrusion and/or blow molding process may include zones with varying heating, such as a feed zone, a transition zone, a metering zone, and an adaptor/head zone. For example, the feed zone may be about 170° C. to about 180° C., the transition and/or metering zone(s) may be about 200° C. to about 225° C., and the adapter/head zone may be about 200° C. to about 225° C.

The morphology of the barrier additive composition in the container, e.g., in the polyolefin matrix can be affected by the melting progression of the barrier additive composition, the polyolefin, or both in the machine. Above 230° C. in the feed zone, the additive barrier composition can melt at the beginning of the screw in the tube. This can cause the melt to overstay in the screw and the barrier additive composition morphology can be decreased or eliminated by the shear stress of the screw over the processing time.

In addition, below 195° C. in the feed zone, the barrier additive composition can melt at the end of the metering zone (e.g., at the end of the screw in the tube), which can result in the barrier additive composition not having an adequate time to melt during the extrusion process.

In between 220° C. and 230° C., the barrier additive composition can melt in the center of the metering zone, which can be advantageous due to the melt not being negatively impacted by excessive time under the screw shear stress.

The provided container can be assessed for unmelt materials. If such materials are present, different zone(s) temperatures of the machine can be altered (e.g., increased) until the unmelt material is no longer present.

As mentioned above, in some embodiments the barrier additive composition, the polyolefin, or both are processed in a continuous extrusion/blow molding machine. The continuous extrusion/blow molding machine can include a barrel, a mixing screw, a head, optional braker plates, optional screen packs, and a mold. The morphology of the barrier additive composition in the container, e.g., in the polyolefin matrix can be affected by the different components of the machine, such as the shear efficacy of the extrusion screw, and/or the presence of screens and brakes.

The barrier additive composition, the polyolefin, or both can be extruded in extruders with varying barrel diameters, such as about 35 mm to about 150 mm. Both smooth and grooved barreled extruders can be used in the method. In some embodiments, the barrel of the extruder is a grooved barrel. An exemplary grooved barrel extruder includes a screw design having a minimum length/diameter of about 20:1; a compression ratio of about 1 to about 2; and at least three zone screws with a constant diameter into the feeding and metering sections. An example smooth barrel extruder includes a screw design having a minimum length/diameter of about 24:1; a compression ratio of about 2 to about 3.5; and at least three zone screws with a constant diameter into the feeding and metering sections. The depth of the metering section can be about 3 mm to about 4 mm for a 60 mm extruder. In addition, the depth of the metering section can be about 3.5 mm to about 4.5 mm for a 90 mm and a 120 mm extruder.

The screw speeds can be about 40 rpm for a 60 mm extruder and about 30 rpm for a 90 mm extruder. In addition, the screw can comprise a high molecular weight, high density polyethylene, e.g., having a density of about 94 $g/cm^3$ to about 96 $g/cm^3$. In some embodiments, the screw comprises a high-density polyethylene having a density of about 95.5 $g/cm^3$.

The mixing screw of the extruder may also affect the morphology of the barrier additive composition in the container. Generally, the extruder/screw system should provide adequate shear and strain to generate a layered additive barrier composition morphology within the container. In some embodiments, the screw does not have an intensive mixing device, such as pins or pineapples.

The head can include an adaptor, a manifold, a feed throat, and a die. It has been found that being able to control a temperature at these four areas/zones can be useful for providing containers including barrier additive compositions. Both system center feed (e.g., torpedo support) and side feed (e.g., mandrel) heads can be used. In some embodiments, the continuous extrusion/blow molding machine includes one, two, three, or more than three heads. In some embodiments, a mixer (e.g., Kenics®) is used to balance the flow rate of the barrier additive composition, the polyolefin, or both in the parison. In some embodiments, the continuous extrusion machine includes center feed head(s) with dual concentric ring support. The head may also include spiders (e.g., elongated, rod-like sections within the head). In some embodiments, less than or equal to six spiders, less than or equal to five spiders, less than or equal to four spiders, less than or equal to three spiders, or less than or equal to two spiders are present in the head. In some embodiments, the head does not include rind torpedo supports. Where side feed heads are used, a passageway through the head can be at least 12.7 inches wide.

Braker plates may be used, however, in some embodiments, braker plates are not present in the continuous extrusion/blow molding machine. In addition, screen packs may be used. In some embodiments where screen packs are used, they have a small gauge.

The mold may be any suitable extrusion blow mold known within the art. The mold may include materials, such as steel and copper-beryllium. The mold may also include a pinch-off area for various sized containers, such as 100 ml, 500 ml, 1 liter, 2 liters, 5 liters, or greater than 10 liters. The mold can be adjusted to provide different volume containers, as well as to provide varying wall thickness of the containers.

C. Methods of Making Films

Also disclosed are methods of making films by processing the barrier additive composition, the polyolefin, or both. For example, the barrier additive composition, the polyolefin, or both can be processed as described above with respect to the container. Making the film does not include, however, providing a parison in a mold. Rather, making the film includes having an extrusion die that is circular in shape. Within the die can be a mandrel that the polymer melt can flow around. In addition, the mandrel can have a gas, such as compressed air, passed through it, which can provide a polymer tube with an air bubble in the tube. The polymer tube can then be collapsed onto a frame and passed through rollers, e.g., nip rollers, to provide the film. The film can be trimmed and processed via means known within the art.

An example method includes blending a barrier additive composition as disclosed herein and a polyolefin in a melt phase to form a polymer blend; extruding the polymer blend; and blow molding the polymer blend provide to the film.

VII. Experimental Examples

Example 1

Example Containers

Example containers with a mass of 175 g and 180 g were made with the barrier additive composition at 9 wt %, 15 wt %, 18 wt %, or 21 wt % in combination with high density polyethylene (HDPE, Chevron Phillips Marlex 5502bn). Regarding the barrier additive composition, the amount of the nylon 6 used was 69% by weight, the amount of compatibilizer was 30% by weight, and the amount of optical tracer was 1% by weight. The HDPE and barrier additive composition were dry blended for 3 to 5 minutes before extruding and blow molding.

The containers were made via the methods described herein. Briefly, the containers were made on a continuous extrusion blow molding machine (Kautex press) having an extruder with a barrel diameter from 38 mm to 150 mm. The depths of the flights in the metering section were between 3 mm and 4 mm for 600 mm extruders and 3.5 mm and 4.5 mm for 90 mm and 120 mm extruders. A center feed head with dual concentric ring support, two rings with two spiders each, and a standard extrusion blow molding mold were used.

The temperature of the feed zone, transition zone, metering zone, and adapter/head zone were initially set (and allowed to stabilize) at 175° C., 205° C., 220° C., and 223° C., respectively. The HDPE was fed into the machine and run until steady state conditions were reached. In addition, the parison melt temperature was checked to ensure that it was approximately 223° C. The parison was continuously checked every 30 minutes.

Figure 2:
FIG. 2 is an image showing a vertical surface (parallel from parison) of an example container.
Figure 4A:
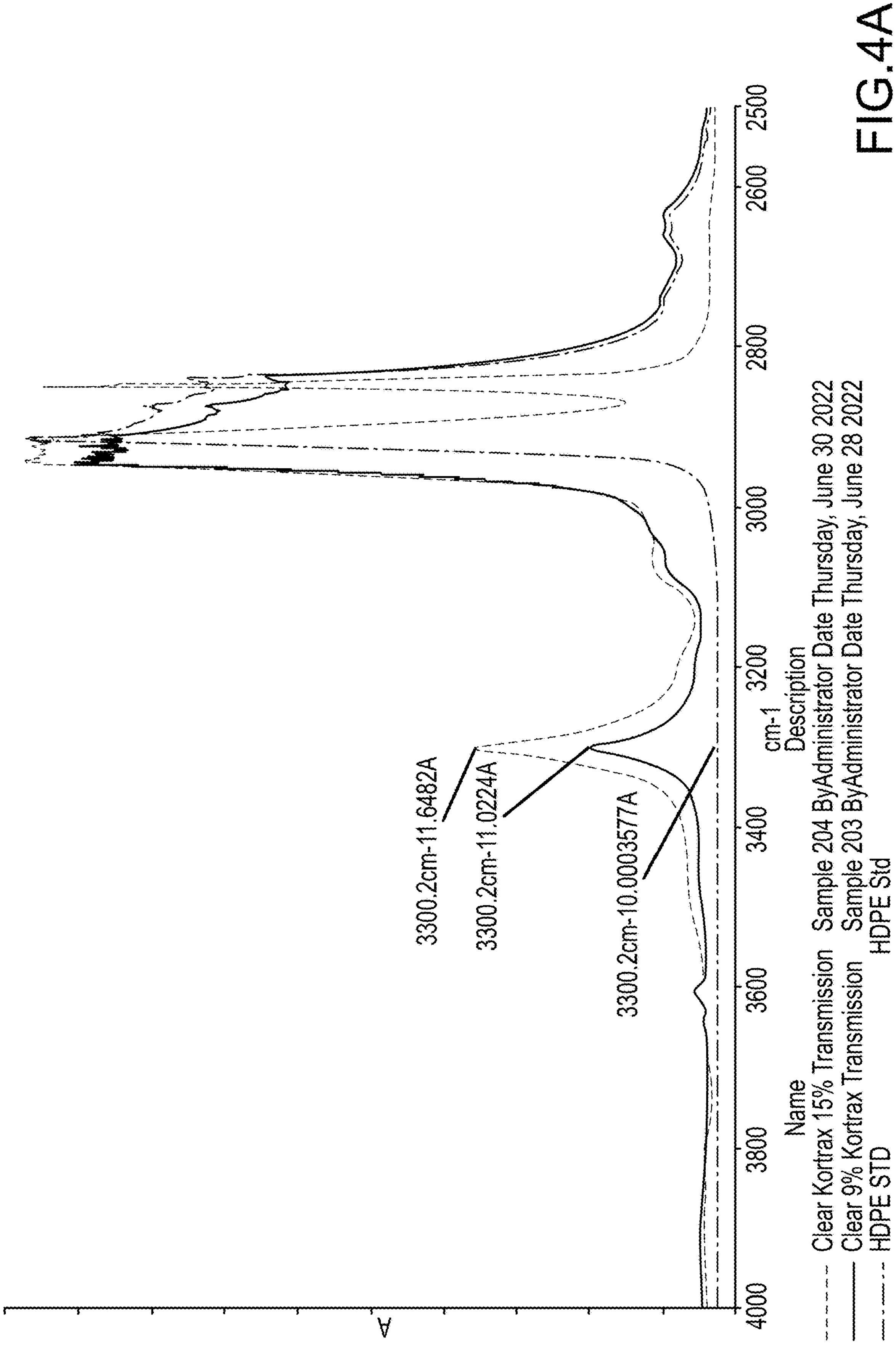
FIG. 4A and FIG. 4B show a Fourier-transform infrared (FTIR) spectroscopy analysis of example containers.
Figure 4B:
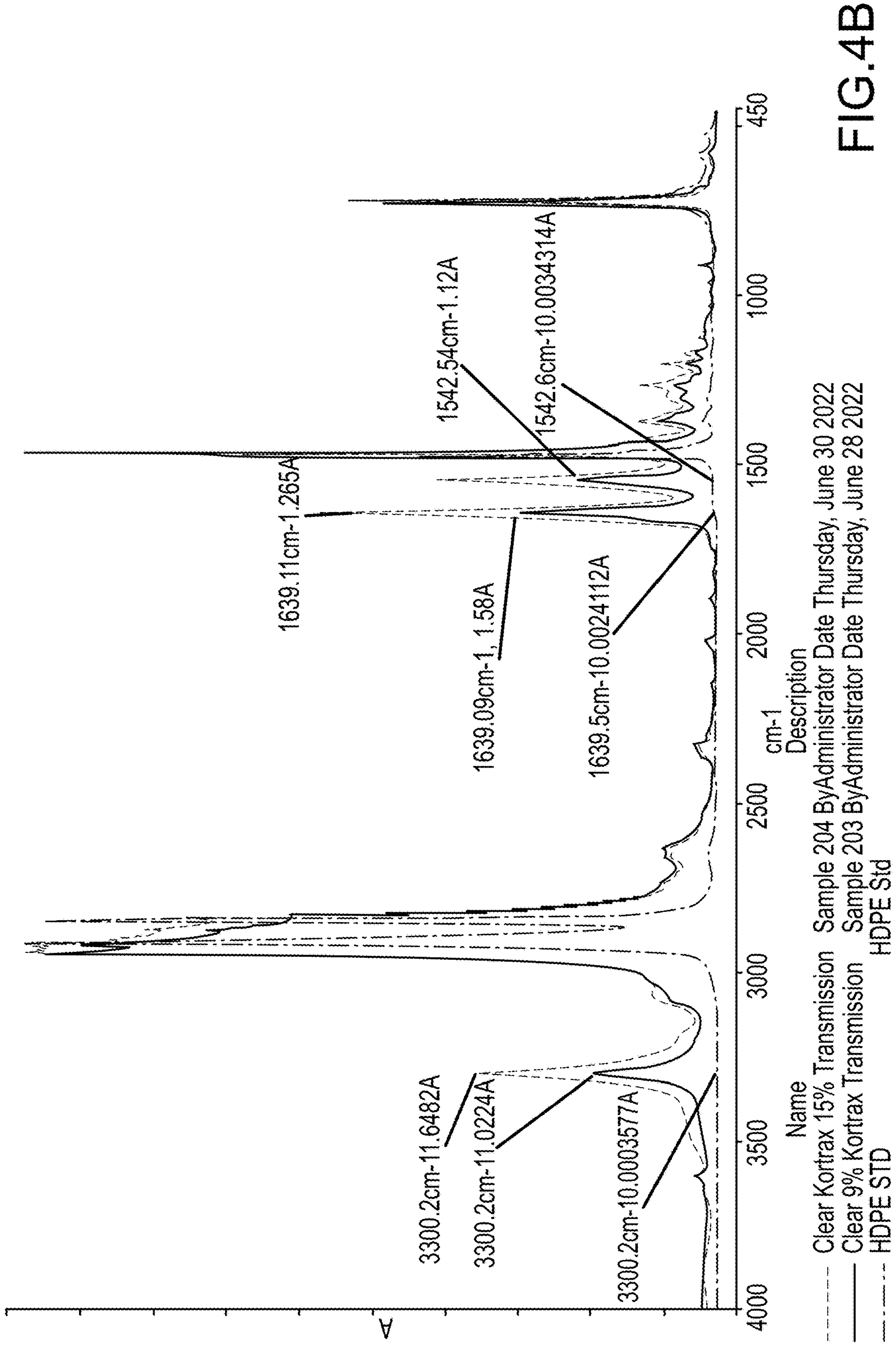

Following production of the containers (see, e.g., FIG. 3), front panels were cut out of example containers and photographed under visible and ultraviolet (UV) light to examine the presence of lamellar layers in the container. FIG. 1 shows a 180 g container with 21% barrier additive composition and FIG. 2 shows a 180 g container with 18% barrier additive composition—both of which have extensive layering. The same layering was seen for the other example containers. Furthermore, when the containers were placed under UV light, it was seen that the barrier additive composition was extensively incorporated into the container. The presence of the barrier additive composition was further confirmed through FTIR spectroscopy, which showed peaks at 3300.2 $cm^{-1}$, 1639 $cm^{-1}$, and 1532 $cm^{-1}$ (FIG. 4A and FIG. 4B). FTIR analysis showed a dose response with an increasing amount of the barrier additive composition. Accordingly, FTIR can be used to quantify the barrier additive composition rate.

Exemplary containers were assessed for their weight loss and deformity for different solvents and oils. As can be seen in FIG. 5, the exemplary containers showed excellent or good barrier properties across a wide variety of different solvents and oils.

Exemplary containers were also assessed for their ability to store different automotive fluids against control containers of HDPE and fluorinated compounds. Containers were assessed at 15 days and 30 days post addition of the automotive fluid. The barrier additive composition outperformed HDPE controls in both annualized loss as measured by percentage and mass throughout all automotive fluids tested. In addition, the barrier additive composition performed as well or better than fluorination controls in both annualized loss as measured by percentage and mass. The results can be seen in Tables 1-10. Bolded values denote failure. Italicized values denote concern.

TABLE 1

| Automotive Fluid 1 | | |
|---|---|---|
| | 15 day | 30 day |
| **HDPE** | | |
| Average Loss | 5.230 | 14.670 |
| % Loss | 0.645 | 1.810 |
| Annualized Loss (%) | **16.824** | **22.022** |
| Annualized Loss (g) | **136.354** | **178.485** |
| **Barrier Additive Composition** | | |
| Average Loss | 0.270 | 0.500 |
| % Loss | 0.033 | 0.060 |
| Annualized Loss (%) | 0.849 | 0.734 |
| Annualized Loss (g) | 7.039 | 6.083 |
| **Fluorination** | | |
| Average Loss | 0.240 | 1.080 |
| % Loss | 0.030 | 0.135 |
| Annualized Loss (%) | *0.780* | *1.639* |
| Annualized Loss (g) | *6.257* | *13.140* |

TABLE 2

| Automotive Fluid 2 | 15 day | 30 day |
|---|---|---|
| HDPE | | |
| Average Loss | 0.720 | 0.740 |
| % Loss | 0.089 | 0.091 |
| Annualized Loss (%) | **2.311** | 1.109 |
| Annualized Loss (g) | **18.771** | 9.003 |
| Barrier Additive Composition | | |
| Average Loss | 0.160 | 0.210 |
| % Loss | 0.020 | 0.027 |
| Annualized Loss (%) | 0.527 | 0.323 |
| Annualized Loss (g) | 4.171 | 2.555 |
| Fluorination | | |
| Average Loss | 0.130 | 0.200 |
| % Loss | 0.016 | 0.025 |
| Annualized Loss (%) | 0.423 | 0.303 |
| Annualized Loss (g) | 3.389 | 2.433 |

TABLE 3

| Automotive Fluid 3 | 15 day | 30 day |
|---|---|---|
| HDPE | | |
| Average Loss | 1.440 | 1.400 |
| % Loss | 0.164 | 0.159 |
| Annualized Loss (%) | **4.277** | **1.941** |
| Annualized Loss (g) | **37.543** | **17.033** |
| Barrier Additive Composition | | |
| Average Loss | 0.150 | 0.200 |
| % Loss | 0.018 | 0.024 |
| Annualized Loss (%) | 0.469 | 0.292 |
| Annualized Loss (g) | 3.911 | 2.433 |
| Fluorination | | |
| Average Loss | 1.040 | 2.300 |
| % Loss | 0.124 | 0.275 |
| Annualized Loss (%) | **3.242** | **3.346** |
| Annualized Loss (g) | **27.114** | **27.983** |

TABLE 4

| Automotive Fluid 4 | 15 day | 30 day |
|---|---|---|
| HDPE | | |
| Average Loss | 2.290 | 2.420 |
| % Loss | 0.402 | 0.424 |
| Annualized Loss (%) | **10.472** | **5.164** |
| Annualized Loss (g) | **59.704** | **29.443** |
| Barrier Additive Composition | | |
| Average Loss | 0.080 | 0.250 |
| % Loss | 0.015 | 0.045 |
| Annualized Loss (%) | 0.378 | 0.552 |
| Annualized Loss (g) | 2.086 | 3.042 |
| Fluorination | | |
| Average Loss | 0.720 | 0.450 |
| % Loss | 0.124 | 0.078 |
| Annualized Loss (%) | **3.238** | 0.945 |
| Annualized Loss (g) | **18.771** | 5.475 |

TABLE 5

| Automotive Fluid 5 | 15 day | 30 day |
|---|---|---|
| HDPE | | |
| Average Loss | 6.260 | 17.800 |
| % Loss | 0.730 | 2.076 |
| Annualized Loss (%) | **19.032** | **25.255** |
| Annualized Loss (g) | **163.207** | **216.567** |
| Barrier Additive Composition | | |
| Average Loss | 0.250 | 0.360 |
| % Loss | 0.031 | 0.044 |
| Annualized Loss (%) | 0.797 | 0.536 |
| Annualized Loss (g) | 6.518 | 4.380 |
| Fluorination | | |
| Average Loss | 0.340 | 2.190 |
| % Loss | 0.042 | 0.272 |
| Annualized Loss (%) | 1.102 | **3.312** |
| Annualized Loss (g) | 8.864 | **26.645** |

TABLE 6

| Automotive Fluid 6 | 15 day | 30 day |
|---|---|---|
| HDPE | | |
| Average Loss | 6.510 | 18.470 |
| % Loss | 0.753 | 2.135 |
| Annualized Loss (%) | **19.619** | **25.976** |
| Annualized Loss (g) | **169.725** | **224.718** |
| Barrier Additive Composition | | |
| Average Loss | 0.180 | 0.200 |
| % Loss | 0.022 | 0.024 |
| Annualized Loss (%) | 0.570 | 0.296 |
| Annualized Loss (g) | 4.693 | 2.433 |
| Fluorination | | |
| Average Loss | 0.110 | 0.410 |
| % Loss | 0.014 | 0.051 |
| Annualized Loss (%) | 0.356 | 0.619 |
| Annualized Loss (g) | 2.868 | 4.988 |

TABLE 7

| Automotive Fluid 7 | 15 day | 30 day |
|---|---|---|
| HDPE | | |
| Average Loss | 7.070 | 19.460 |
| % Loss | 0.821 | 2.260 |
| Annualized Loss (%) | **21.409** | **27.500** |
| Annualized Loss (g) | **184.325** | **233.52** |
| Barrier Additive Composition | | |
| Average Loss | 0.520 | 0.740 |
| % Loss | 0.063 | 0.090 |
| Annualized Loss (%) | 1.651 | 1.096 |
| Annualized Loss (g) | 13.557 | 8.88 |
| Fluorination | | |
| Average Loss | 1.750 | 7.510 |
| % Loss | 0.215 | 0.923 |
| Annualized Loss (%) | **5.610** | **11.236** |
| Annualized Loss (g) | **45.625** | **91.372** |

TABLE 8

| Automotive Fluid 8 | 15 day | 30 day |
|---|---|---|
| HDPE | | |
| Average Loss | 6.820 | 62.970 |
| % Loss | 0.791 | 7.306 |
| Annualized Loss (%) | **20.631** | **88.895** |
| Annualized Loss (g) | **177.807** | **766.135** |
| Barrier Additive Composition | | |
| Average Loss | 0.130 | 0.160 |
| % Loss | 0.016 | 0.020 |
| Annualized Loss (%) | 0.415 | 0.238 |
| Annualized Loss (g) | 3.389 | 1.947 |
| Fluorination | | |
| Average Loss | 1.170 | 3.710 |
| % Loss | 0.144 | 0.458 |
| Annualized Loss (%) | **3.766** | **5.573** |
| Annualized Loss (g) | **30.504** | **45.138** |

TABLE 9

| Automotive Fluid 9 | 15 day | 30 day |
|---|---|---|
| HDPE | | |
| Average Loss | 7.500 | 20.900 |
| % Loss | 0.881 | 2.454 |
| Annualized Loss (%) | **22.963** | **29.862** |
| Annualized Loss (g) | **195.536** | **254.283** |
| Barrier Additive Composition | | |
| Average Loss | 0.200 | 0.240 |
| % Loss | 0.024 | 0.029 |
| Annualized Loss (%) | 0.636 | 0.356 |
| Annualized Loss (g) | 5.214 | 2.920 |
| Fluorination | | |
| Average Loss | 0.770 | 4.580 |
| % Loss | 0.093 | 0.556 |
| Annualized Loss (%) | **2.436** | **6.760** |
| Annualized Loss (g) | **20.075** | **55.723** |

TABLE 10

| Automotive Fluid 10 | 15 day | 30 day |
|---|---|---|
| HDPE | | |
| Average Loss | 0.060 | 0.080 |
| % Loss | 0.007 | 0.009 |
| Annualized Loss (%) | 0.178 | 0.111 |
| Annualized Loss (g) | 1.564 | 0.973 |
| Barrier Additive Composition | | |
| Average Loss | 0.050 | 0.060 |
| % Loss | 0.006 | 0.007 |
| Annualized Loss (%) | 0.160 | 0.089 |
| Annualized Loss (g) | 1.304 | 0.730 |
| Fluorination | | |
| Average Loss | 0.090 | 0.090 |
| % Loss | 0.011 | 0.011 |
| Annualized Loss (%) | 0.289 | 0.135 |
| Annualized Loss (g) | 2.346 | 1.095 |

Example 2

Exemplary Films

Exemplary films having a thickness of 2 mil (~50 μm) were made with the barrier additive composition at 10 wt %, 15 wt %, or 20 wt % in combination with HDPE. Regarding the barrier additive composition, the amount of the nylon 6 used was 69% by weight, the amount of compatibilizer was 30% by weight, and the amount of optical tracer was 1% by weight. The HDPE and barrier additive composition were dry blended for 3 to 5 minutes before extruding and blow molding.

The films were made via the methods described herein. Briefly, the films were made on a continuous extrusion blow molding machine (Kautex press) having an extruder with a barrel diameter from 38 mm to 150 mm. The depths of the flights in the metering section were between 3 mm and 4 mm for 600 mm extruders and 3.5 mm and 4.5 mm for 90 mm and 120 mm extruders. A center feed head with dual concentric ring support, two rings with two spiders each, and a standard extrusion blow molding mold were used.

The temperature of the feed zone, transition zone, metering zone, and adapter/head zone were initially set (and allowed to stabilize) at 175° C., 205° C., 220° C., and 223° C., respectively. The HDPE was fed into the machine and run until steady state conditions were reached.

Exemplary Embodiments

For reasons of completeness, the following Embodiments are provided.

Clause 1. A barrier additive composition comprising: a nylon 6; a compatibilizer comprising maleic anhydride grafted polyethylene or polypropylene, wherein the maleic anhydride is grafted at greater than 0.5% to less than 1.5% by weight of the polyethylene or polypropylene; and an optical tracer.

Clause 2. The barrier additive composition of clause 1, wherein the nylon 6 has a number average molecular weight of greater than 2000 Daltons.

Clause 3. The barrier additive composition of clause 1 or 2, wherein the nylon 6 has a specific gravity of about 1.06 $g/cm^3$ to about 1.14 $g/cm^3$, a melting point of about 220° C. to about 235° C., a flexural modulus of about 250,000 psi to about 450,000 psi, or a combination thereof.

Clause 4. The barrier additive composition of any one of clauses 1-3, wherein the barrier additive composition comprises the nylon 6 at about 40% to about 80% by weight of the composition.

Clause 5. The barrier additive composition of any one of clauses 1-4, wherein the compatibilizer has a specific gravity of about 0.875 $g/cm^3$ to about 0.960 $g/cm^3$, a melting point of about 63° C. to about 130° C., or a combination thereof.

Clause 6. The barrier additive composition of any one of clauses 1-5, wherein the barrier additive composition comprises the compatibilizer at about 25% to about 60% by weight of the composition.

Clause 7. The barrier additive composition of any one of clauses 1-6, wherein the polyethylene of the compatibilizer is selected from the group consisting of a linear low-density polyethylene, a low-density polyethylene, a high-density polyethylene, and a combination thereof.

Clause 8. The barrier additive composition of any one of clauses 1-7, wherein the polyethylene of the compatibilizer has a density of about 0.92 $g/cm^3$ to about 0.97 $g/cm^3$.

Clause 9. The barrier additive composition of any one of clauses 1-8, wherein the maleic anhydride is grafted at about 1% to about 1.3% by weight of the polyethylene or polypropylene.

Clause 10. The barrier additive composition of any one of clauses 1-9, wherein the barrier additive composition comprises the optical tracer at about 0.5% to about 5% by weight of the composition.

Clause 11. The barrier additive composition of any one of clauses 1-10, wherein the optical tracer comprises an ultraviolet tracer, a fluorescent tracer, or a combination thereof.

Clause 12. A polymer blend comprising: a barrier additive composition as in any one of clauses 1-11; and a polyolefin.

Clause 13. The polymer blend of clause 12, wherein the polymer blend further comprises a UV protection additive, a heat protection additive, an antioxidant protection additive, or a combination thereof.

Clause 14. A container comprising: a body; and a neck finish, wherein at least the body comprises a barrier additive composition as in any one of clauses 1-11 and a polyolefin.

Clause 15. The container of clause 14, wherein the polyolefin comprises a high-density polyethylene, a low-density polyethylene, a linear low-density polyethylene, an ethylene-propylene copolymer, a polypropylene, or a combination thereof.

Clause 16. The container of clause 14 or 15, wherein the barrier additive composition has a lamellar structure in a polyolefin matrix.

Clause 17. The container of any one of clauses 14-16, wherein at least the body has a solvent barrier rate of no more than 2% as measured by solvent weight lost over a period of about 28 days at about 50° C.

Clause 18. The container of any one of clauses 14-17, wherein at least the body has an oxygen transfer rate of at least 97% less compared to a body without the barrier additive composition, a water vapor transmission rate of at least 99.98% less compared to a body without the barrier additive composition, or a combination thereof.

Clause 19. The container of any one of clauses 14-18, wherein the container does not include any fluorinated compounds.

Clause 20. A film comprising: a barrier additive composition as in any one of clauses 1-11; and a polyolefin, wherein the film has a thickness of about 0.05 mm to about 5 mm.

Clause 21. A method of making a barrier additive composition, the method comprising: blending a nylon 6 and a compatibilizer, the compatibilizer comprising maleic anhydride grafted polyethylene or polypropylene, wherein the maleic anhydride is grafted at greater than 0.5% to less than 1.5% by weight of the polyethylene or polypropylene, in a melt phase to form a barrier additive blend; and extruding the barrier additive blend into pellets.

Clause 22. The method of clause 21, wherein the nylon 6 is sprayed with an optical tracer before blending with the compatibilizer, the pellets are sprayed with an optical tracer, or a combination thereof.

Clause 23. A method of making a container, the method comprising: blending a barrier additive composition as prepared in clause 21 or according to any one of clauses 1-11 and a polyolefin in a melt phase to form a polymer blend; extruding the polymer blend to provide a parison in a mold; and blow molding the parison to provide the container.

Clause 24. A method of making a film, the method comprising: blending a barrier additive composition as prepared in clause 21 or according to any one of clauses 1-11 and a polyolefin in a melt phase to form a polymer blend; extruding the polymer blend; and blow molding the polymer blend to provide the film.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. A polymer blend comprising:

a barrier additive composition, comprising:

a nylon 6;

a compatibilizer comprising maleic anhydride grafted polyethylene or polypropylene, wherein the maleic anhydride is grafted at greater than 0.5% to less than 1.5% by weight of the polyethylene or polypropylene, wherein the compatibilizer has a melting point of about 63° C. to about 100° C.;

wherein the compatibilizer has a specific gravity of about 0.875 g/$cm^3$ to less than 0.900 g/$cm^3$; and an optical tracer, wherein the optical tracer is an ultraviolet tracer; and a polyolefin that is an ethylene-propylene copolymer.

2. The polymer blend of claim 1, wherein the polymer blend further comprises a UV protection additive, a heat protection additive, an antioxidant protection additive, or a combination thereof.

3. A container comprising:

a body, and a neck finish, wherein at least the body comprises a barrier additive composition, comprising:

a nylon 6;

a compatibilizer comprising maleic anhydride grafted polyethylene or polypropylene, wherein the maleic anhydride is grafted at greater than 0.5% to less than 1.5% by weight of the polyethylene or polypropylene, wherein the compatibilizer has a melting point of about 63° C. to about 100° C.;

wherein the compatibilizer has a specific gravity of about 0.875 g/$cm^3$ to less than 0.900 g/$cm^3$; and an optical tracer, wherein the optical tracer is an ultraviolet tracer; and a polyolefin that is an ethylene-propylene copolymer.

4. The container of claim 3, wherein the barrier additive composition has a lamellar structure in the polyolefin.

5. The container of claim 3, wherein at least the body has a solvent barrier rate of no more than 2% as measured by solvent weight lost over a period of about 28 days at about 50° C.

6. The container of claim 3, wherein at least the body has an oxygen transfer rate of at least 97% less compared to a body without the barrier additive composition, a water vapor transmission rate of at least 99.98% less compared to a body without the barrier additive composition, or a combination thereof.

7. The container of claim 3, wherein the container does not include any fluorinated compounds.

8. A method of making the container of claim 3, the method comprising:

blending the barrier additive composition as in claim 3 and the polyolefin in a melt phase to form a polymer blend;

extruding the polymer blend to provide a parison in a mold; and blow molding the parison to provide the container.

9. A film comprising:

a barrier additive composition comprising:

a nylon 6;

a compatibilizer comprising maleic anhydride grafted polyethylene or polypropylene, wherein the compatibilizer has a melting point of about 63° C. to about 100° C.:

wherein the maleic anhydride is grafted at greater than 0.5% to less than 1.5% by weight of the polyethylene or polypropylene, wherein the compatibilizer has a specific gravity of about 0.875 g/$cm^3$ to less than 0.900 g/$cm^3$; and an optical tracer, wherein the optical tracer is an ultraviolet tracer, and a polyolefin that is an ethylene-propylene copolymer, wherein the film has a thickness of about 0.05 mm to about 5 mm.

10. A method of making the film of claim 9, the method comprising:

blending the barrier additive composition and the polyolefin in a melt phase to form a polymer blend;

extruding the polymer blend; and blow molding the polymer blend to provide the film.

* * * * *